United States Patent
Sugahara (10) Patent No.: US 12,375,258 B2
(45) Date of Patent: Jul. 29, 2025

(54) SEMICONDUCTOR DEVICE AND CONTROL METHOD THEREOF

(71) Applicant: RENESAS ELECTRONICS CORPORATION, Tokyo (JP)

(72) Inventor: Takahiko Sugahara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 267 days.

(21) Appl. No.: 18/059,139

(22) Filed: Nov. 28, 2022

(65) Prior Publication Data

US 2023/0254114 A1    Aug. 10, 2023

(30) Foreign Application Priority Data

Jan. 27, 2022  (JP) .................................. 2022-011160

(51) Int. Cl.
 G06F 21/72    (2013.01)
 H04L 9/06     (2006.01)

(52) U.S. Cl.
 CPC ............ H04L 9/0618 (2013.01); G06F 21/72 (2013.01)

(58) Field of Classification Search
 CPC ................................ H04L 9/0618; G06F 21/72
 See application file for complete search history.

(56) References Cited

U.S. PATENT DOCUMENTS

| | | |
|---|---|---|
| 7,584,365 B2 | 9/2009 | Mizuno et al. |
| 10,341,089 B2 | 7/2019 | Miller |
| 11,636,046 B1* | 4/2023 | Tran ...................... H04L 9/0631 380/43 |
| 2020/0150895 A1* | 5/2020 | Kim ....................... G06F 3/0679 |
| 2020/0186330 A1* | 6/2020 | Lan ........................ H04L 9/003 |
| 2020/0351108 A1* | 11/2020 | Moriyama ............ H04L 9/0816 |
| 2021/0006391 A1* | 1/2021 | Wei ....................... H04L 9/0861 |
| 2021/0057002 A1* | 2/2021 | Chen ..................... H04L 9/0618 |

(Continued)

FOREIGN PATENT DOCUMENTS

| | | |
|---|---|---|
| JP | H01-99341 A | 4/1989 |
| JP | 2006-319589 A | 11/2006 |
| JP | 2018-514816 A | 6/2018 |

OTHER PUBLICATIONS

Office Action dated May 27, 2025, from corresponding Japan Application No. 2022-011160, 13 pages.

*Primary Examiner* — Stephen T Gundry
(74) *Attorney, Agent, or Firm* — Rimon P.C.

(57) ABSTRACT

A semiconductor device and a control method thereof capable of satisfying both security requirements and functional safety requirements while suppressing an increase in the circuit scale. The semiconductor device includes: a first encryptor having a first encryption processing unit that performs encryption process on plaintext data input from the outside to generate the first encryption data; a decryptor having first a first decryption processing unit that performs decryption processing in synchronization with an encryption process in the first encryption device to generate the first decryption data for the first encryption data generated in the first encryptor; a comparator that compares the plaintext data with the first decrypted data corresponding to the plaintext data; and a control unit that performs failure determination for the first encryptor and the first decryptor based on the comparison result by the comparator.

16 Claims, 7 Drawing Sheets

(56) References Cited

U.S. PATENT DOCUMENTS

| | | | |
|---|---|---|---|
| 2021/0152531 A1* | 5/2021 | Pan | H04W 4/44 |
| 2021/0264063 A1* | 8/2021 | Monji | G06F 21/85 |
| 2021/0266175 A1* | 8/2021 | Bernsen | H04L 9/0861 |
| 2021/0336766 A1* | 10/2021 | Kim | H04L 9/0869 |
| 2022/0045850 A1* | 2/2022 | Ejiri | H04L 9/0643 |
| 2022/0156392 A1* | 5/2022 | Kataoka | G06F 21/6218 |
| 2022/0283731 A1* | 9/2022 | Yoo | G06F 3/0659 |
| 2022/0368543 A1* | 11/2022 | Hori | H04L 9/0869 |
| 2022/0414023 A1* | 12/2022 | Kumar | G09C 1/00 |
| 2023/0035988 A1* | 2/2023 | Kim | H04L 9/008 |
| 2023/0044822 A1* | 2/2023 | Hosoyamada | H04L 9/14 |
| 2023/0087142 A1* | 3/2023 | Kawai | H04L 9/3073 |
| | | | 380/44 |
| 2023/0112699 A1* | 4/2023 | Hiromasa | H04L 9/008 |
| | | | 713/164 |
| 2023/0122687 A1* | 4/2023 | Nakagawa | H04L 9/0897 |
| | | | 713/171 |
| 2023/0135891 A1* | 5/2023 | Eun | G06N 20/00 |
| | | | 726/28 |
| 2023/0163943 A1* | 5/2023 | Koo | G06F 21/606 |
| | | | 713/189 |

* cited by examiner

SEMICONDUCTOR DEVICE AND CONTROL METHOD THEREOF

CROSS-REFERENCE TO RELATED APPLICATIONS

The disclosure of Japanese Patent Application No. 2022-011160 filed on Jan. 27, 2022, including the specification, drawings and abstract is incorporated herein by reference in its entirety.

BACKGROUND

The present invention relates to a semiconductor device and a control method thereof, and, for example, to a semiconductor device and a control method thereof suitable for satisfying both security requirements and functional safety requirements while suppressing an increase in circuit scale.

Recently, in the field of ECU (Electronic Control Unit) which is an example of semiconductor device, the necessity to satisfy the security requirements to prevent the attack from a malicious third party in the communication between ECUs is increasing. At the same time, the communication between ECUs must satisfy a high level of functional safety requirements so as not to cause a malfunction.

AES (Advanced Encryption Standard) technique is known as an exemplary encryption technique used to satisfy security requirements.

Functional safety requirements also require the assurance of a high level of safety that satisfies ASIL (Automotive Safety Integrity Level) of functional safety standards. ASIL indicates the level of hazard that should be avoided among the potential hazards in electronic systems. It is specified in ISO26262. Specifically, ASIL is expressed in four stages from A to D, where ASIL-A indicates the lowest degree of hazard, and ASIL-D indicates the highest degree of hazard.

In an in-vehicle electronic system where the highest functional safety level (i.e., ASIL-D) is required, a safety mechanism called DCLS (Dual Core Lockstep) in which two cores are paired to perform Lockstep operation is used. In the Lockstep operation, the processing results of each of the two cores simultaneously executing the same processing are compared, and if the processing results coincide with each other, it is determined that a failure has not occurred, and if the processing results do not coincide with each other, it is determined that a failure has occurred.

Here, when an encryption module employing an encryption technique that satisfies the security requirements (for example, an encryption module employing an AES encryption technique) is DCLS to satisfy the functional safety requirements, the encryption module is duplicated, the original encryption process is performed in one encryption module, the encryption process for verification (comparison) is performed in the other encryption module, and then the result of the encryption process performed by one encryption module is compared with the result of the encryption process performed by the other encryption module, thereby realizing a Lockstep operation.

More specifically, one of the duplicated encryption modules performs encryption process on the plaintext data input from the outside to generate the first encrypted data, and the other encryption module performs encryption process on the plaintext data common to one of the encryption modules to generate the second encrypted data. The comparator compares the encrypted data generated in each of the duplicated encryption modules to determine whether or not the encrypted data coincides with each other. This enables fault detection at a high level.

Incidentally, the duplication of the encryption module is effective not only for detection of accidental failures, but also for detection of failures intentionally formed by fault attack, etc., which is one of side channel attacks. Side-channel attacks, unlike the safety grounds of modern encryptors such as AES and RSA, which are considered computationally secure against encryption analysis methods, are attack methods that attempt to illegally acquire secret information by observing implementation-dependent leakage information, such as current consumption and processing time, by physical means. As concrete attack techniques, DPA (Differential Power Analysis) attack, CPA (Correlation Power Analysis) attack, and fault attack are known.

SUMMARY

However, the duplication of the encryption modules not only increases the circuit scale, but also, when the duplicated encryption modules are in Lockstep operation, the side channel information is increased as compared with the case where the encryption module of the single unit is operated, so that the resistance to the side channel attack is reduced. Other objects and novel features will become apparent from the description of this specification and the accompanying drawings.

According to an embodiment, a semiconductor device includes: a first encryptor having a first encryption process unit for generating a first encrypted data by performing an encryption process on plaintext data input from outside; a first decryptor having a first decryption process unit for generating a first decrypted data by performing a decryption process for the first encrypted data in synchronization with the encryption process; a comparator for comparing the plaintext data and the first decrypted data corresponding to the plaintext data; and a control unit for performing a failure determination process for the first encryptor and the first decryptor in the comparison result by the comparator.

According to an embodiment, a method of controlling a semiconductor device including first encryptor and a first decryptor, generating a first encrypted data by performing an encryption process for plaintext data input from outside, generating a first decrypted data by performing a decryption process for the first encrypted data in synchronization with the encryption process, comparing the plaintext data and the first decrypted data corresponding to the plaintext data, and determining whether there is a failure in any of the first encryptor and the first decryptor based on the result of comparison.

The present disclosure may provide a semiconductor device and a control method thereof capable of satisfying both security and functional safety requirements while suppressing an increase in circuit scale.

DETAILED DESCRIPTION

Hereinafter, with reference to the drawings, the embodiment will be described. Since the drawings are simplified, the technical scope of the embodiment should not be interpreted narrowly based on the description of the drawings. Further, the same elements are denoted by the same reference numerals, without redundant description.

In the following embodiments, if necessary for convenience, the description will be divided into sections or embodiments. However, unless otherwise specified, they are not independent of each other, and one is in the relationship of some or all modifications of the other, applications, detailed explanation, supplemental explanation, etc. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

(Prior Consideration by the Inventor)

Before describing the details of the semiconductor device according to a first embodiment, the present inventor will be described semiconductor device considered in advance.

Figure 1:
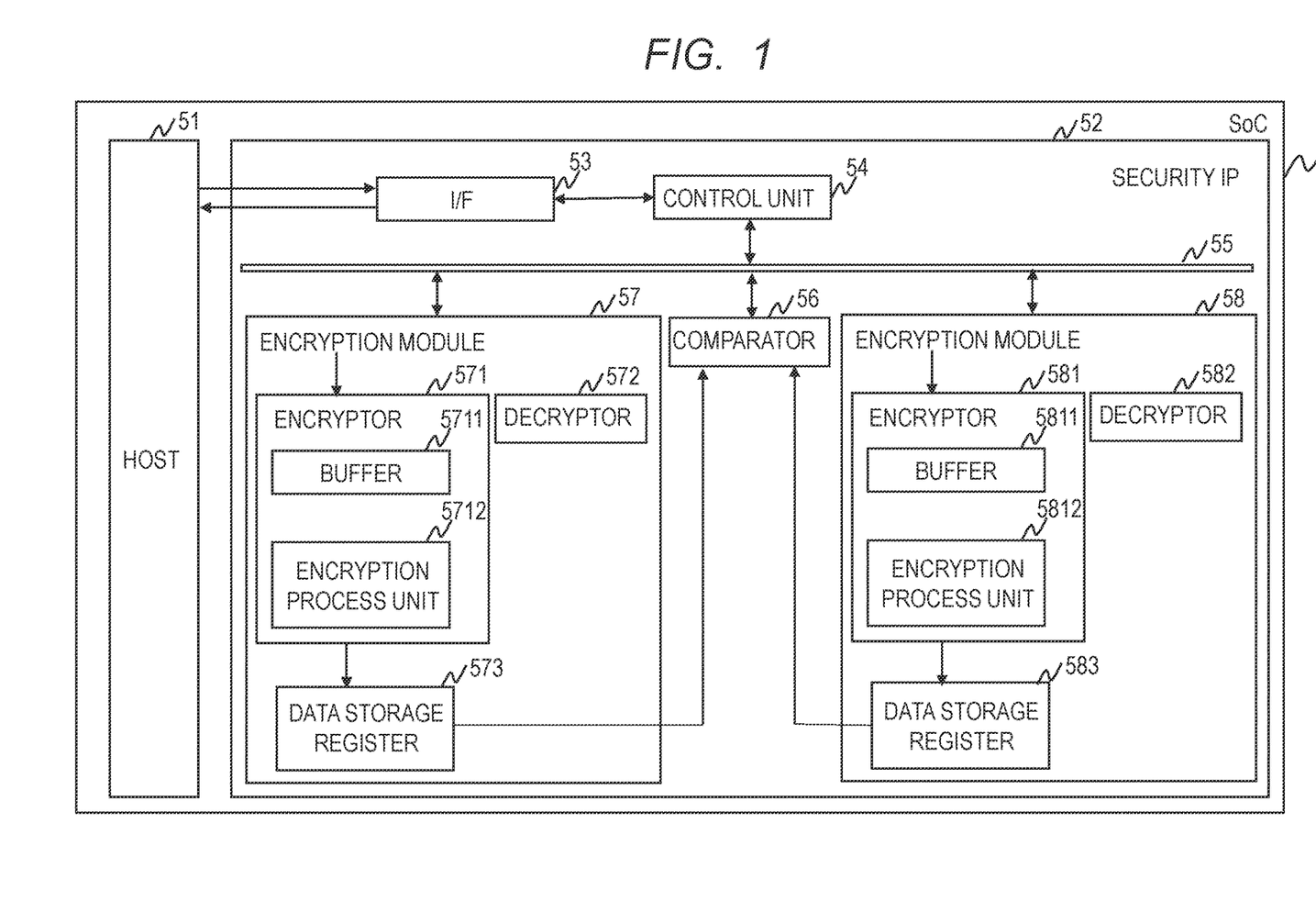
FIG. 1 is a block diagram showing a configuration example of a semiconductor device of the conception stage.

FIG. 1 is a block diagram showing a configuration example of a semiconductor device 5 of the conception stage. The semiconductor device 5 is, for example, an SoC (System on Chip), and includes a host computer 51 and a security IP (Intellectual Property) 52.

The security IP 52 is one of the functional blocks and performs encryption process and decryption process of data used in the host computer 51 for enhanced security. For example, the security IP 52 encrypts the plaintext data received from the host computer 51 and returns the encrypted data to the host computer 51, or decrypts the encrypted data received from the host computer 51 and returns the encrypted data to the host computer 51 as plaintext data. The security IP 52 also employs a safety mechanism called a DCLS in which a duplicated encryption module is paired to perform Lockstep operation. Thereby, the semiconductor device 5 can satisfy both the security requirements and the functional safety requirements.

Specifically, the security IP 52 includes at least an interface unit (I/F) 53, a control unit 54, a bus 55, a comparator 56, an encryption module 57, and an encryption module 58.

The interface unit 53 is a unit for transferring data to and from the host computer 51.

The control unit 54 performs general control of the security IP 52. For example, the control unit 54 instructs the encryption modules 57 and 58 to encrypt the plaintext data or to decrypt the encrypted data. Further, the control unit 54, the comparator 56, also instructs to perform predetermined comparison process. The transfer of data (including instructions) between the control unit 54 and the encryption module 57, the encryption module 58, and the comparator 56 is performed via the bus 55.

The encryption module 57 encrypts the plaintext data received from the host computer 51 or decrypts the encrypted data received from the host computer 51 in accordance with an instruction from the control unit 54. The encryption module 58 encrypts the plaintext data received from the host computer 51 or decrypts the encrypted data received from the host computer 51 in accordance with an instruction from the control unit 54. For example, AES encryption technology is employed in each of the encryption modules 57, 58.

The encryption module 57 includes at least an encryptor 571, a decryptor 572, and a data storage register 573.

The encryptor 571 has at least a buffer 5711 and an encryption process unit 5712. The buffer 5711 temporarily stores plaintext data received from the host computer 51. The encryption process unit 5712 performs encryption process using, for example, S-box (Substitution-box) on the plaintext data stored in the buffer 5711 to generate the encrypted data. The decryptor 572 performs decryption process using, for example, an inverse source S-box on the encrypted data received from the host computer 51 to generate decrypted data (plaintext data).

The encryption module 58 has the same configuration as the encryption module 57 and includes at least an encryptor 581, a decryptor 582, and a data storage register 583.

The encryptor 581 has at least a buffer 5811 and an encryption process unit 5812. The buffer 5811 temporarily stores plaintext data received from the host computer 51. The encryption process unit 5812 performs encryption process using, for example, an S-box on the plaintext data stored in the buffer 5811 to generate the encrypted data. The decryptor 582 performs decryption process using, for example, an inverse source S-box on the encrypted data received from the host computer 51 to generate decrypted data (plaintext data). The encryption module 58 is provided for checking (for comparison) whether or not the processing result of the encryption module 57 is correct.

A comparator 56, according to an instruction from the control unit 54, compares the respective processing results by the encryption modules 57, 58. The detailed operation of the encryption modules 57, 58 and the comparator 56 will be described later.

(Operation of the Semiconductor Device)

Figure 2:
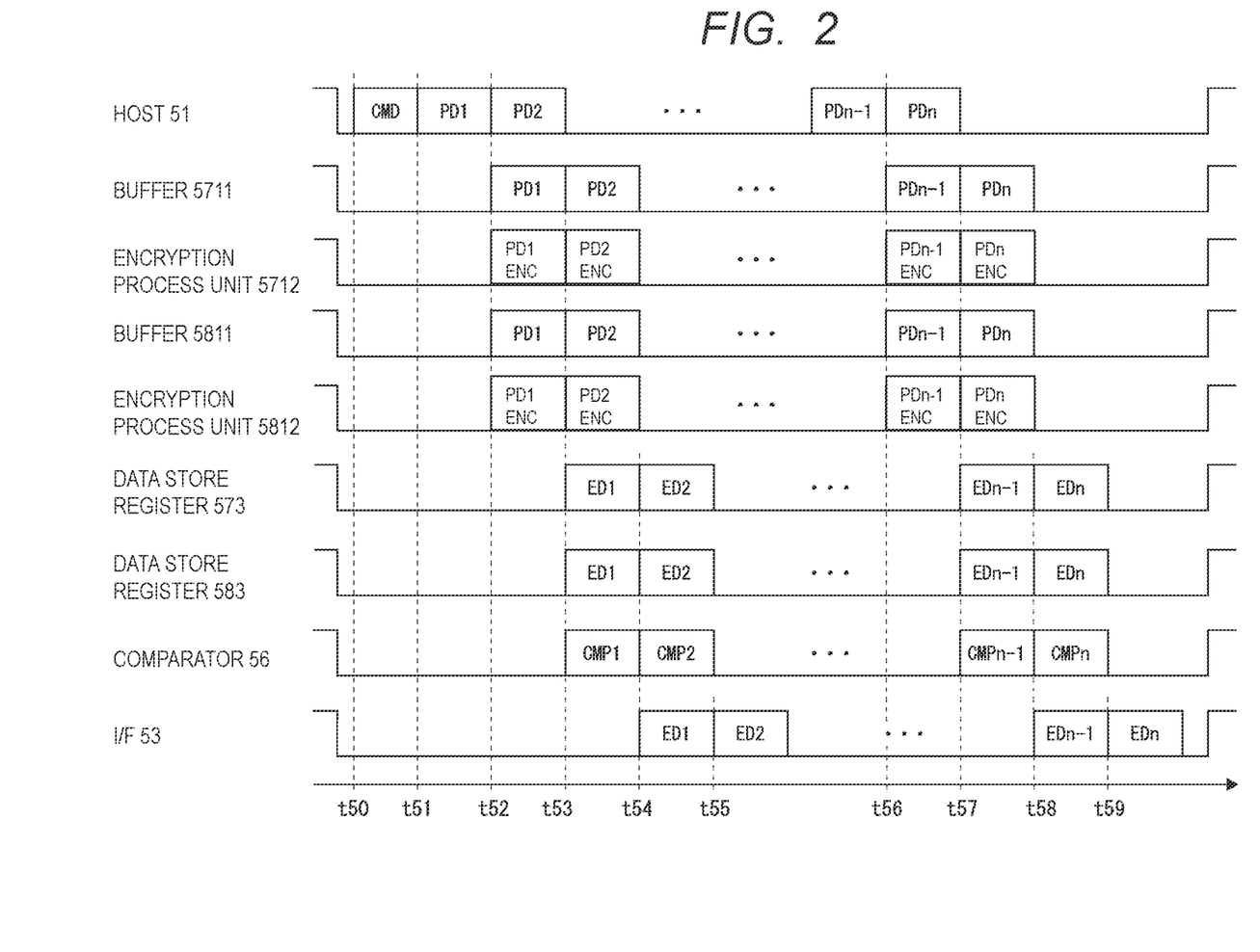
FIG. 2 is a timing chart showing an example of the operation of the semiconductor device shown in FIG. 1.

Subsequently, with reference to FIG. 2, the operation of the semiconductor device 5 will be described. FIG. 2 is a timing chart showing an example of the operation of the semiconductor device 5. In the following description, a case where the data format of the communication protocol includes a control command CMD and plaintext data PD1 to PDn of n (where n is an integer equal to or greater than 1) blocks added to the control command CMD will be described as an example.

First, the host computer 51 transmits a control command CMD that instructs encryption process to the security IP 52 (at t50), and sequentially transmits plaintext data PD1 to PDn of n blocks following the control command CMD (from t51 to t56).

In the security IP 52, the control unit 54 receives the control command CMD transmitted from the host computer 51 through an interface unit 53 and decrypts the control command CMD. Thus, the control unit 54 recognizes the instruction content from the host computer 51. The control unit 54 sequentially receives the plaintext data PD1 to PDn transmitted from the host computer 51 following the control command CMD through the interface unit 53.

Then, the control unit 54 sequentially transfers the plaintext data PD1 to PDn to both of the encryption modules 57, 58 (from t52 to t57).

The encryption module 57 performs pipeline process of encryption for the plaintext data PD1 to PDn.

Specifically, in the encryptor 571, the buffer 5711 temporarily stores the plaintext data PD1 to PDn sequentially transferred from the control unit 54 (from t52 to t57). Then, the encryption process unit 5712 performs encryption process for the plaintext data PD1 to PDn sequentially stored in the buffer 5711 (from t52 to (57). The encrypted data ED1 to EDn sequentially generated by the encryption process unit 5712 are sequentially temporarily stored in the data storage register 573 (from t53 to t58).

For pipeline process, more particularly, first, the buffer 5711 temporarily stores the plaintext data PD1 which has been transferred from the control unit 54 (at t52). The encryption process unit 5712 performs encryption process on the plaintext data PD1 stored in the buffer 5711 (at t52). An encrypted data ED1 generated by the encryption process unit 5712 is temporarily stored in the data storage register 573 (at t53). At this time, the buffer 5711 temporarily stores the plaintext data PD2 which has been transferred next from the control unit 54 (at t53). Thus, the encryption process unit 5712 can immediately perform encryption process on the plaintext data PD2 after the encryption process of the plaintext data PD1 (at t53). The encrypted data ED2 generated by the encryption process unit 5712 is temporarily stored (overwritten) in the data storage register 573 (at t54). In encryption module 57, such pipeline process is repeated until encryption is performed on plaintext data PDn.

The encryption module 58 performs pipeline process of encryption for the plaintext data PD1 to PDn in parallel with the encryption module 57.

Specifically, in the encryptor 581, the buffer 5811 sequentially temporarily stores the plaintext data PD1 to PDn that have been sequentially transferred from the control unit 54 (from t52 to t57). Then, the encryption processing unit 5812 performs encryption process for the plaintext data PD1 to PDn sequentially stored in the buffer 5811 (from t52 to t57). The encrypted data ED1 to EDn sequentially generated by the encryption process unit 5812 are sequentially temporarily stored in the data storage register 583 (from t53 to t58).

For pipeline process, more particularly, first, the buffer 5811 temporarily stores the plaintext data PD1 which has been transferred from the control unit 54 (at t52). The encryption process unit 5812 performs encryption process on the plaintext data PD1 stored in the buffer 5811 (at t52). An encrypted data ED1 generated by the encryption process unit 5812 is temporarily stored in the data storage register 583 (at t53). At this time, the buffer 5811 temporarily stores the plaintext data PD2 which has been transferred next from the control unit 54 (at t53). Thus, the encryption process unit 5812 can immediately perform encryption process on the plaintext data PD2 after the encryption process of the plaintext data PD1 (at t53). The encrypted data ED2 generated by the encryption process unit 5812 is temporarily stored (overwritten) in the data storage register 583 (at (54). In the encryption module 58, such pipeline process is repeated until encryption is performed on the plaintext data PDn.

The comparator 56 sequentially compares the encrypted data ED1 to EDn sequentially stored in the data storage register 573 with the encrypted data ED1 to EDn sequentially stored in the data storage register 583 (from t53 to t58). In the example of FIG. 2, a comparison process of the encrypted data EDi (i is any integer from 1 to n) stored in the data storage register 573 and the encrypted data EDi stored in the data storage register 583 by the comparator 56 is represented as a CMPi.

The control unit 54, based on the comparison result by the comparator 56, performs a failure determination for the encryption module 57 (encryptor 571).

For example, when the respective processing results of the encryption modules 57, 58 compared by the comparator 56 match, the control unit 54 determines that there is no failure in the encryption module 57, and sequentially transmits the encrypted data ED1 to EDn acquired from the data storage register 573 to the host computer 51 through the interface unit 53 (from t54 to t59)

On the other hand, when the processing results of the encryption modules 57, 58 compared by the comparator 56 do not coincide with each other, the control unit 54 determines that a failure has occurred in any of the encryption modules 57, 58, does not transmit the encrypted data ED1 to the host computer 51, and interrupts the subsequent processing.

Thus, the semiconductor device 5 satisfies both the security requirements and the functional safety requirements by performing encryption process using the security IP 52 equipped with the duplicated encryption module.

However, in the semiconductor device 5, in order to realize a Lockstep operation for satisfying the functional safety requirements, it is necessary to duplicate the encryption module, the circuit scale increases. Further, in the semiconductor device 5, since the side channel information increases compared with the case of the encryption process by one encryption module by the encryption process by each of the duplicated encryption modules, the resistance against the side channel attack is reduced. That is, in the semiconductor device 5, it is still impossible to sufficiently satisfy the security requirements.

Therefore, the semiconductor device 1 according to the first embodiment, which can satisfy both the security requirements and the functional safety requirements while suppressing an increase in the circuit scale, has been found.

First Embodiment

Figure 3:
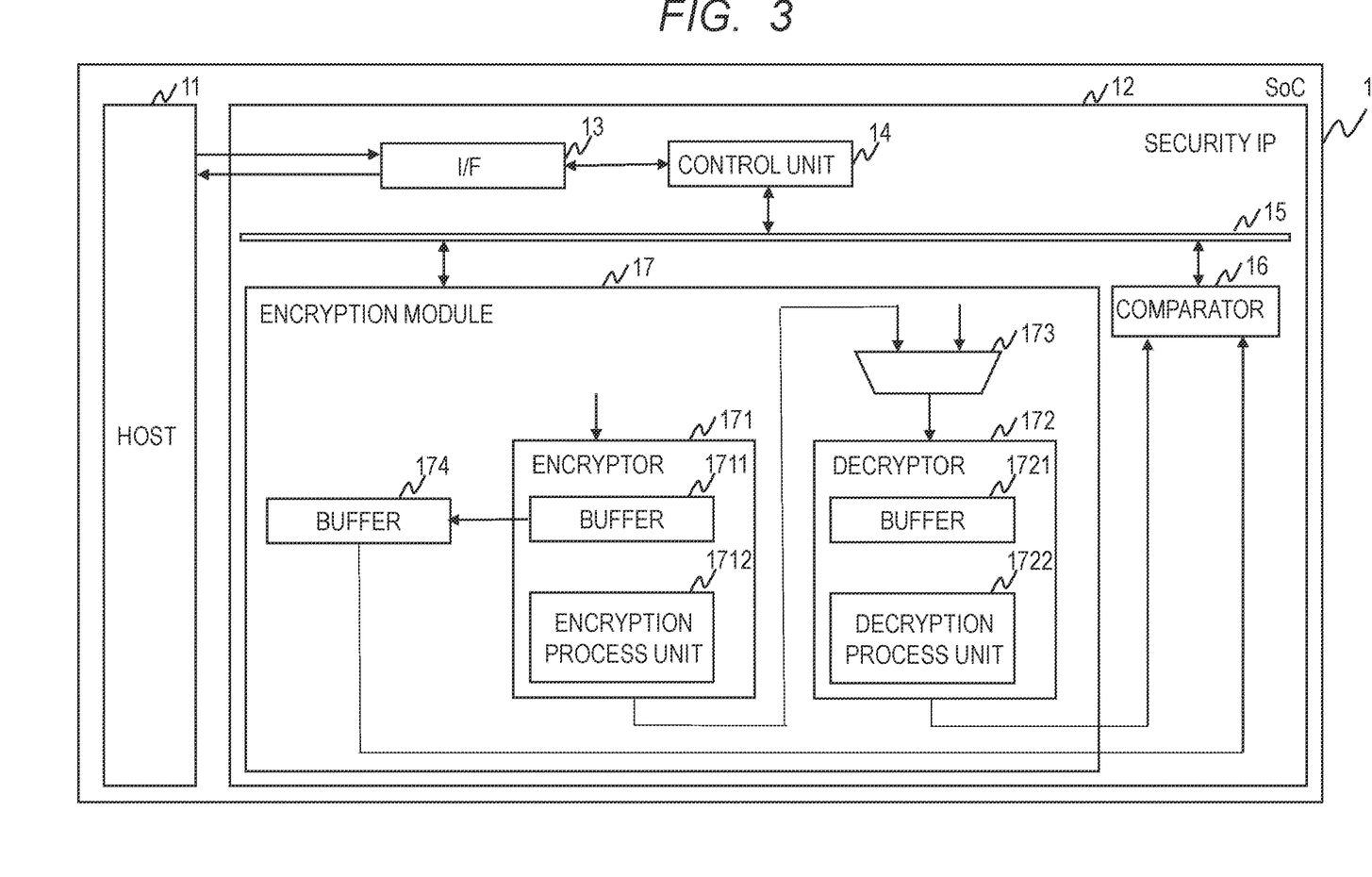
FIG. 3 is a block diagram showing a configuration example of a semiconductor device according to a first embodiment.

FIG. 3 is a block diagram showing a configuration example of a semiconductor device 1 according to the first embodiment. The semiconductor device 1 is, for example, SoCs, and includes a host computer 11 and a security IP 12.

The security IP 12 is one of the functional blocks, and performs encryption process and decryption process of data used in the host computer 11 in order to enhance security. For example, the security IP 12 encrypts the plaintext data received from the host computer 11 and transmits the encrypted data to the host computer 11, or decrypts the encrypted data received from the host computer 11 and transmits the encrypted data to the host computer 11 as plaintext data. In addition, the security IP 12 implements the same operation as DCLS by using an encryptor and a decryptor mounted on a single encryption module.

Specifically, the security IP 12 includes at least an interface unit (I/F) 13, a control unit 14, a bus 15, a comparator 16, and an encryption module 17.

The interface unit 13 is a unit for transferring data to and from the host computer 11.

The control unit 14 performs general control of the security IP 12. For example, the control unit 14 instructs the encryption module 17 to encrypt the plaintext data or to decrypt the encrypted data. The control unit 14 also instructs the comparator 16 to perform predetermined comparison process. The transfer of data (including instructions) between the control unit 14 and the encryption module 17 and the comparator 16 is performed via the bus 15.

The encryption module 17 encrypts the plaintext data received from the host computer 11 or decrypts the encrypted data received from the host computer 11 in accordance with an instruction from the control unit 14. For example, AES encryption technology is employed in the encryption module 17.

The encryption module 17 includes at least an encryptor 171, a decryptor 172, a selector 173, and a buffer (data holding unit) 174.

The encryptor 171 has at least a buffer 1711 and an encryption process unit 1712. The buffer 1711 temporarily stores plaintext data received from the host computer 11. The encryption process unit 1712 performs encryption process using, for example, S-box on the plaintext data stored in the buffer 1711 to generate the encrypted data. The buffer 174 temporarily stores the plaintext data stored in the buffer 1711, that is, the plaintext data in which the encryption process is performed by the encryption process unit 1712.

The selector 173 selects and outputs either the encrypted data generated by the encryptor 171 or the encrypted data received from the host computer 11, depending on the operation mode. For example, the selector 173 selects and outputs the encrypted data generated by the encryptor 171 when the operation mode is a first mode, and selects and outputs the encrypted data received from the host computer 11 when the operation mode is a second mode. Incidentally, the operation mode is switched and controlled by the control unit 14 which has received an instruction from the host computer 11.

The decryptor 172 has at least a buffer 1721 and a decryption process unit 1722. The buffer 1721 temporarily stores the encrypted data output from the selector 173. The decryption process unit 1722 performs decryption process using, for example, the inverse original S-box on the encrypted data stored in the buffer 1721 to generate the decrypted data (plaintext data). Here, the decryption process unit 1722 performs decryption process of the encrypted data in synchronization with the encryption process of the plaintext data by the encryption process unit 1712. Thus, since the noise (side channel information) generated by the encryption process of the encryption process unit 1712 is disturbed by the noise generated by the decryption process of the decryption process unit 1722, the immunity to the side channel attack is improved.

A comparator 16 performs a predetermined comparison process according to an instruction from the control unit 14. For example, the comparator 16 compares the plaintext data stored in the buffer 174 with the decrypted data generated in the decryptor 172 when the operation mode is the first mode, and does not perform comparison process when the operation mode is the second mode. The detailed operation of the encryption module 17 and the comparator 16 will be described later.

(Operation of the Semiconductor Device)

Figure 4:
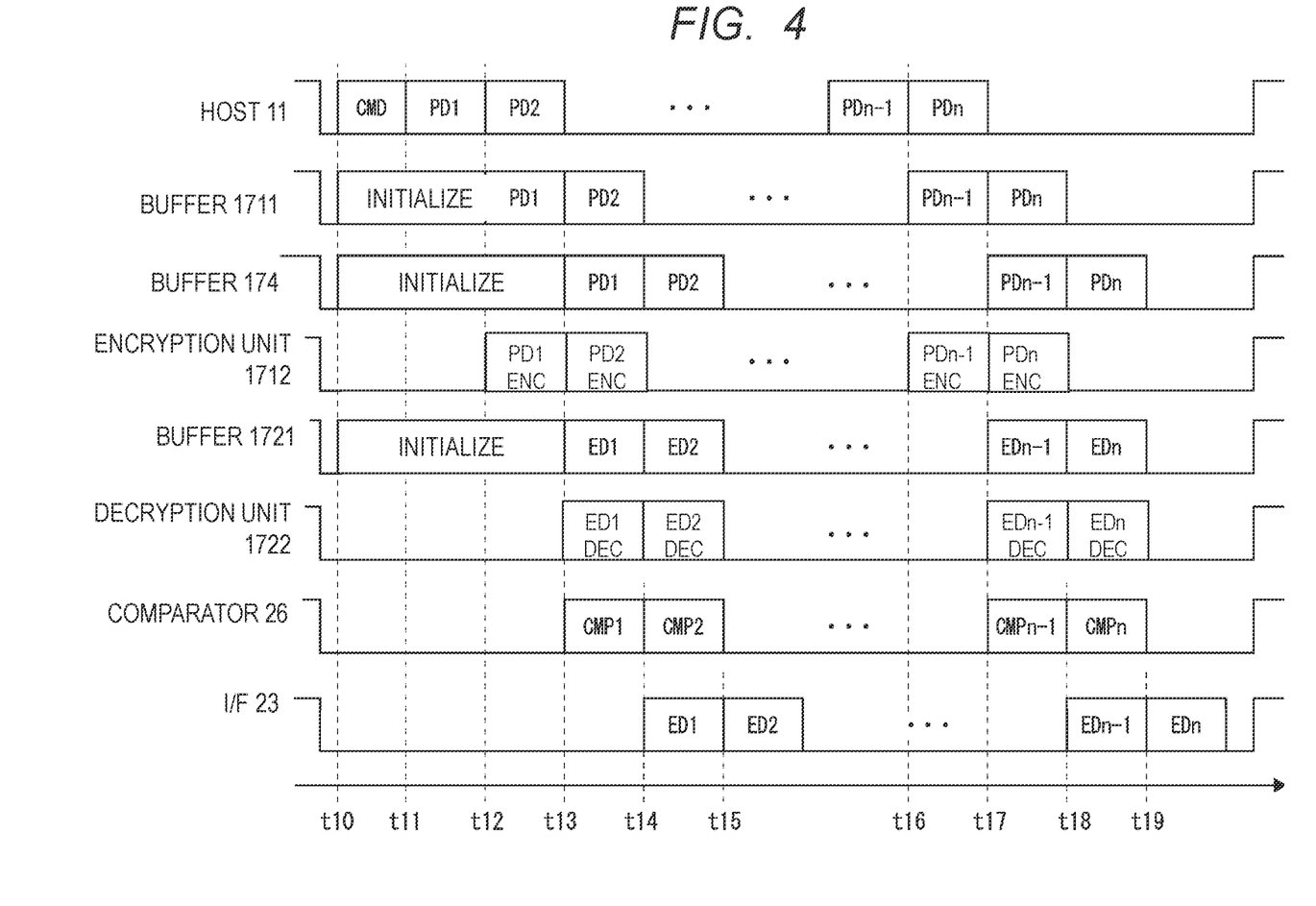
FIG. 4 is a timing chart showing an example of the operation of the semiconductor device shown in FIG. 3.

Subsequently, with reference to FIG. 4, the operation of the semiconductor device 1 will be described. FIG. 4 is a timing chart showing an example of the operation of the semiconductor device 1. In the following description, a case where the data format of the communication protocol includes a control command CMD and plaintext data PD1 to PDn of n (where n is an integer equal to or greater than 1) blocks added to the control command CMD will be described as an example.

First, the host computer 11 transmits the control command CMD that instructs the encryption process to the security IP 12 (at t10) and sequentially transmits the plaintext data PD1 to PDn of n blocks following the control command CMD (from t11 to t16).

In the security IP 12, the control unit 14 receives the control command CMD transmitted from the host computer 11 through the interface unit 13 and decrypts the control command CMD. Thus, the control unit 14 recognizes the instruction content from the host computer 11. Here, since the control command CMD includes an instruction for encrypting the plaintext data PD1 to PDn, the control unit 14 sets the operation mode to the first mode. Thus, the selector 173 selects and outputs the output of the encryptor 171. The control unit 14 sequentially receives the plaintext data PD1 to PDn transmitted from the host computer 11 following the control command CMD through the interface unit 13.

The control unit 14 sequentially transfers the plaintext data PD1 to PDn to the encryption module 17 (from t12 to t17).

In the encryption module 17, pipeline process for encryption and decryption is performed for the plaintext data PD1 to PDn. Specifically, in the encryptor 171, the buffer 1711 temporarily stores the plaintext data PD1 to PDn sequentially transferred from the control unit 14 (from t12 to t17). Then, the encryption process unit 1712 performs encryption process for the plaintext data PD1 to PDn sequentially stored in the buffer 1711 (from t12 to t17). The encrypted data ED1 to EDn sequentially generated by the encryption process unit 1712 are transferred to the decryptor 172 via the selector 173 and are temporarily stored sequentially in the buffer 1721 (from t13 to t18). In parallel, the plaintext data PD1 to PDn sequentially stored in the buffer 1711 of the encryptor 171 is temporarily stored in the buffer 174 (from t13 to t18).

In the decryptor 172, the decryption process unit 1722 sequentially generates the decrypted data PD1 to PDn by performing decryption process for the encrypted data ED1 to EDn sequentially stored in the buffer 1721 (from t13 to t18). Here, the decryption process unit 1722 performs decryption process of the encrypted data in synchronization with the encryption process of the plaintext data by the encryption process unit 1712 provided in the encryptor 171. Thus, since the noise (side channel information) generated by the encryption process of the encryption process unit 1712 is disturbed by the noise generated by the decryption process of the decryption process unit 1722, the immunity to the side channel attack is improved.

For pipeline process, more particularly, first, the buffer 1711 temporarily stores the plaintext data PD1 which has been transferred from the control unit 14 (at t12). The encryption process unit 1712 performs encryption process on the plaintext data PD1 stored in the buffer 1711 (at t12). An encrypted data ED1 generated by the encryption process unit 1712, via the selector 173, is transferred to the decryptor 172 is temporarily stored in the buffer 1721 (at t13). The decryption process unit 1722 performs decryption process on the encrypted data ED1 stored in the buffer 1721 to generate the decrypted data PD1 (at t13).

At this time, the buffer 174 temporarily stores the plaintext data PD1 stored in the buffer 1711 of the encryptor 171 (at t13). Further, at this time, the buffer 1711 temporarily stores the plaintext data PD2 that has been transferred next from the control unit 14 (at t13). Thus, the encryption process unit 1712 can immediately perform encryption process on the plaintext data PD2 after the encryption process of the plaintext data PD1 (at t13). An encrypted data ED2 generated by the encryption process unit 1712, via the selector 173, is transferred to the decryptor 172 is temporarily stored in the buffer 1721 (at t14). The decryption process unit 1722 performs decryption process on the encrypted data ED2 stored in the buffer 1721 to generate the decrypted data PD2 (at t14).

In the encryption module 17, such pipeline process is repeated until encryption and decryption are performed on the plaintext data PDn.

The comparator 16 sequentially compares the plaintext data PD1 to PDn, which are sequentially stored in the buffer 174, and the decrypted data PD1 to PDn, which are sequentially generated in the decryptor 172 (from t13 to t18). In the example of FIG. 4, the comparator 16 compares the plaintext data PDi stored in the buffer 174 with the decrypted data PDi generated in the decryptor 172 as a CMPi.

Based on the comparison result by the comparator 16, the control unit 14 performs a failure determination for the encryption module 17 (encryptor 171 and decryptor 172).

For example, when the unencrypted plaintext data PD1 to PDn stored in the buffer 174 and the decrypted data PD1 to PDn generated in the decryptor 172 coincide with each other, the control unit 14 determines that there is no failure in the encryption module 17, and sequentially transmits the encrypted data ED1 to EDn generated in the encryptor 171 from the buffer 1721 to the host computer 11 through the interface unit 13 (from t14 to t19).

On the other hand, when the unencrypted plaintext data PD1 to PDn stored in the buffer 174 do not coincide with the decrypted data PD1 to PDn generated in the decryptor 172, the control unit 14 determines that a failure has occurred in the encryption module 17 (at least one of the encryptor 171 and the decryptor 172), does not transmit the encrypted data ED1 to EDn to the host computer 11, and interrupts subsequent processing. In this case, since a failure occurring in the encryption module 17 may be accidental failure, the control unit 14 may perform encryption of the plaintext data PD1 to PDn, the decryption of the encrypted data ED1 to EDn, the comparison of the plaintext data PD1 to PDn with the decrypted data PD1 to PDn, and the failure determination based on the comparison result. However, when it is determined that a failure has occurred in the encryption module 17 even after a predetermined number of repetitions, the failure occurring in the encryption module 17 is determined to be a permanent failure.

Thus, the semiconductor device 1 according to the present embodiment, without duplicating the encryption module, because it realizes the same operation as DCLS using the encryptor and the decryptor provided in one encryption module, it is possible to suppress an increase in circuit scale. Further, in the semiconductor device 1 according to the present embodiment, by synchronizing the encryption process by the encryptor with the decryption process by the decryptor and operating in synchronization, the noise (side channel information) generated by the encryption process can be disturbed by the noise generated by the decryption process, thereby improving the resistance to side channel attacks such as DPA attacks and CPA attacks. That is, the semiconductor device 1 according to the present embodiment can satisfy both the security requirements and the functional safety requirements while suppressing an increase in the circuit scale.

Incidentally, the control unit 14 may be any of a hardware sequencer and a CPU (Central Processing Unit).

The interface unit 13 may include a register that temporarily stores data to be transferred between the host computer 11 and the control unit 14 of the security IP 12. For example, in the security IP 12, first, the interface unit 13 receives the plaintext data transmitted from the host computer 11 and temporarily stores the plaintext data, and the control unit 14 receives the plaintext data stored in the interface unit 13 and decrypts the plaintext data.

(Modification of the Semiconductor Device)

Figure 5:
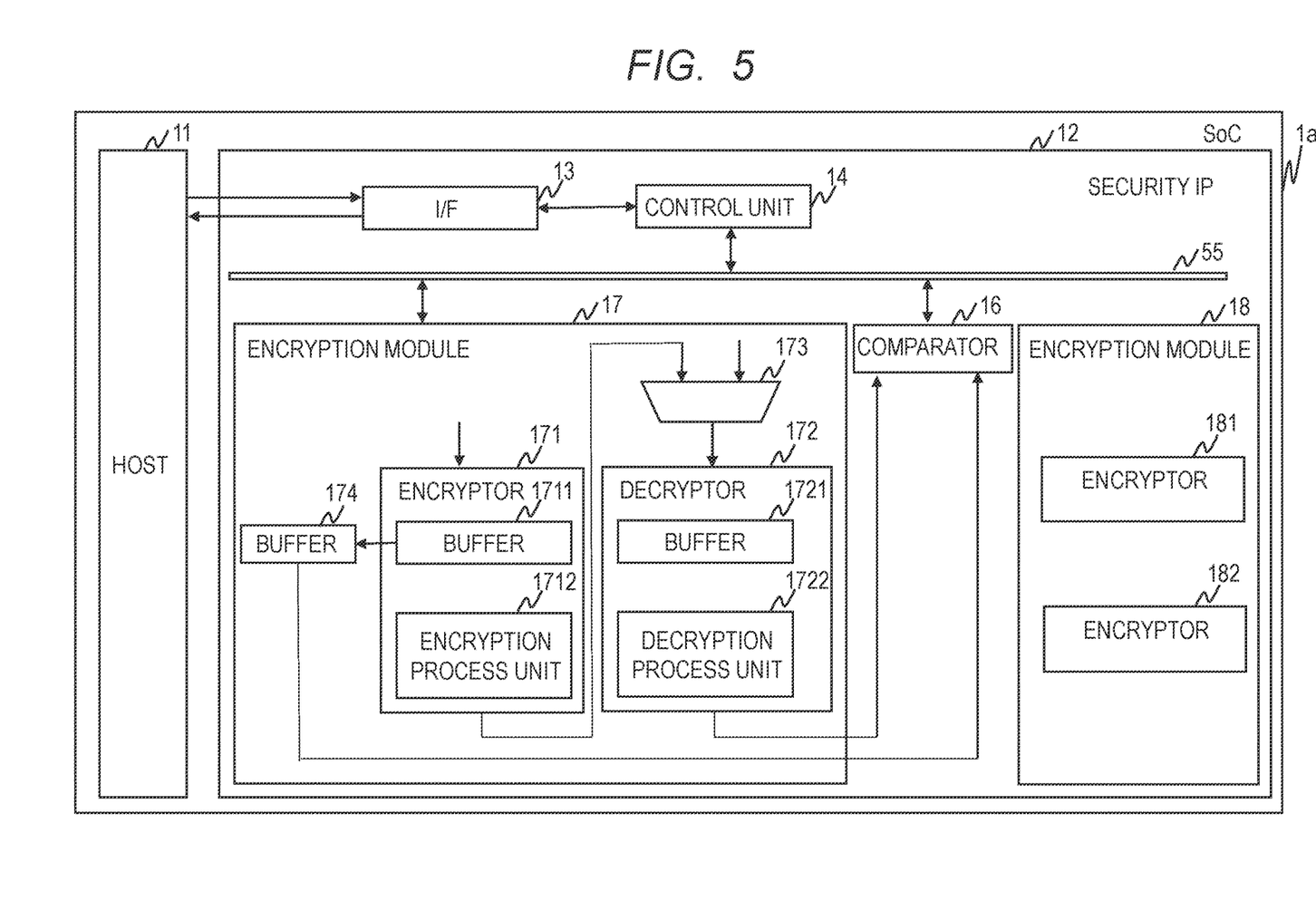
FIG. 5 is a block diagram showing a modification of the semiconductor device according to the first embodiment.

FIG. 5 is a block diagram showing a modification of the semiconductor device 1 as a semiconductor device 1a. The semiconductor device 1a further comprises an encryption module 18 having at least an encryptor 181 and a decryptor 182 as compared to the semiconductor device 1. Other configurations of the semiconductor device 1a, since the same as the semiconductor device 1, a description thereof will be omitted.

Since the operation equivalent to DCLS can be realized by using one of the encryption modules 17 instead of using both the encryption modules 17, 18 to realize the operation of DCLS, the other encryption module 18 can be used for encrypted communication of another application. Thus, the semiconductor device 1a can improve the calculation performance of the entire security function.

Second Embodiment

Figure 6:
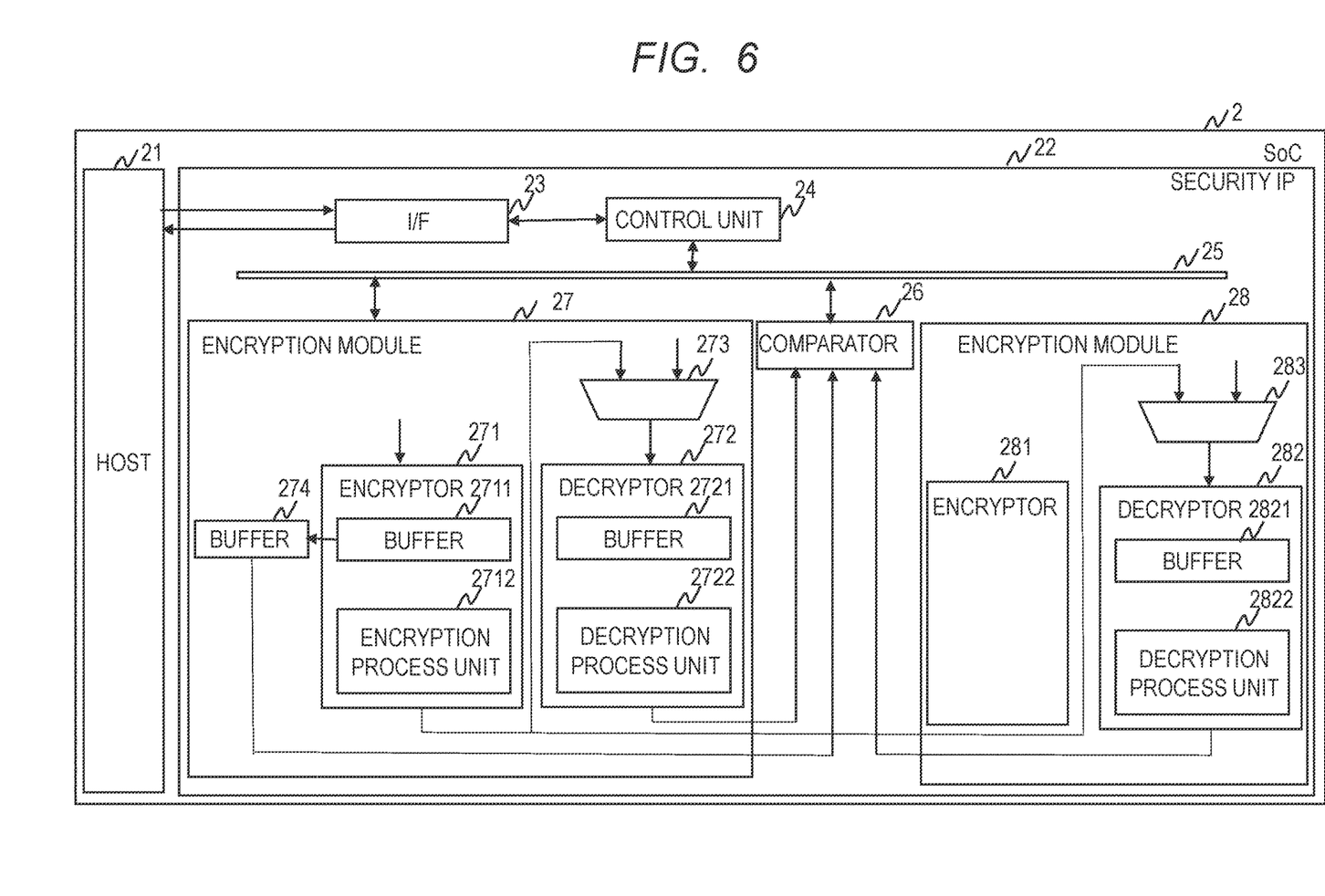
FIG. 6 is a block diagram showing a configuration example of a semiconductor device according to a second embodiment.

FIG. 6 is a block diagram showing a configuration example of a semiconductor device 2 according to the second embodiment. For example, the semiconductor device 2 is an SoC, and includes a host computer 21 and a security IP 22. Incidentally, the host computer 21 and the security IP 22 in the semiconductor device 2 correspond to the host computer 11 and the security IP 12 in the semiconductor device 1, respectively.

The security IP 22 includes an interface unit 23, a control unit 24, a bus 25, a comparator 26, an encryption module 27 and an encryption module 28. Incidentally, the interface unit 23, the control unit 24, the bus 25, the comparator 26, and the encryption module 27 in the semiconductor device 2, respectively, the interface unit 13 in the semiconductor device 1, the control unit 14, the bus 15, the comparator 16, and corresponds to the encryption module 17.

The encryption module 27 includes at least an encryptor 271, a decryptor 272, a selector 273, and a buffer (data holding unit) 274. The encryptor 271 has at least a buffer 2711 and an encryption process unit 2712. The decryptor 272 has at least a buffer 2721 and a decryption process unit 2722. Incidentally, the encryptor 271, the decryptor 272, the selector 273, and the buffer 274 in the semiconductor device 2, respectively, corresponding to the encryptor 171, the decryptor 172, the selector 173, and the buffer 174 in the semiconductor device 1. The buffer 2711 and the encryption process unit 2712 in the encryptor 271, respectively, corresponds to the buffer 1711 and the encryption process unit 1712 in the encryptor 171. The buffer 2721 and the decryption process unit 2722 in the decryptor 272 correspond to the buffer 1721 and the decryption process unit 1722 in the decryptor 172, respectively.

The encryption module 28 includes at least an encryptor 281, a decryptor 282, and a selector 283. The decryptor 282 has at least a buffer 2821 and a decryption process unit 2822. The encryptor 281 generates encrypted data by performing encryption process using, for example, an S-box on the plaintext data received from the host computer 21. The selector 283 selects and outputs either the encrypted data generated by the encryptor 271 of the encryption module 27 or the encrypted data received from the host computer 21, depending on the operation mode. For example, the selector 283 selects and outputs the encrypted data generated by the encryptor 271 of the encryption module 27 when the operation mode is the first mode, and selects and outputs the encrypted data received from the host computer 21 when the operation mode is the second mode. In the decryptor 282, a buffer 2821 temporarily stores the encrypted data output from the selector 283. The decryption process unit 2822 performs decryption process using, for example, the inverse original S-box on the encrypted data stored in the buffer 2821 to generate the decrypted data (plaintext data). Here, the decryption process units 2722, 2822 perform decryption process of the encrypted data in synchronization with the encryption process of the plaintext data by the encryption process unit 2712. Accordingly, since the noise (side channel information) generated by the encryption process of the encryption process unit 2712 is disturbed by the noise generated by the decryption process of the decryption process units 2722, 2822, the immunity to the side channel attack is further improved.

A comparator 26 performs a predetermined comparison process according to an instruction from the control unit 24. For example, the comparator 26 compares the plaintext data stored in the buffer 274 with the decrypted data generated in the decryptor 272 and the decrypted data generated in the decryptor 282 when the operation mode is the first mode, and does not perform comparison process when the operation mode is the second mode. The detailed operation of the encryption modules 27, 28 and the comparator 26 will be described later.

(Operation of the Semiconductor Device)

Figure 7:
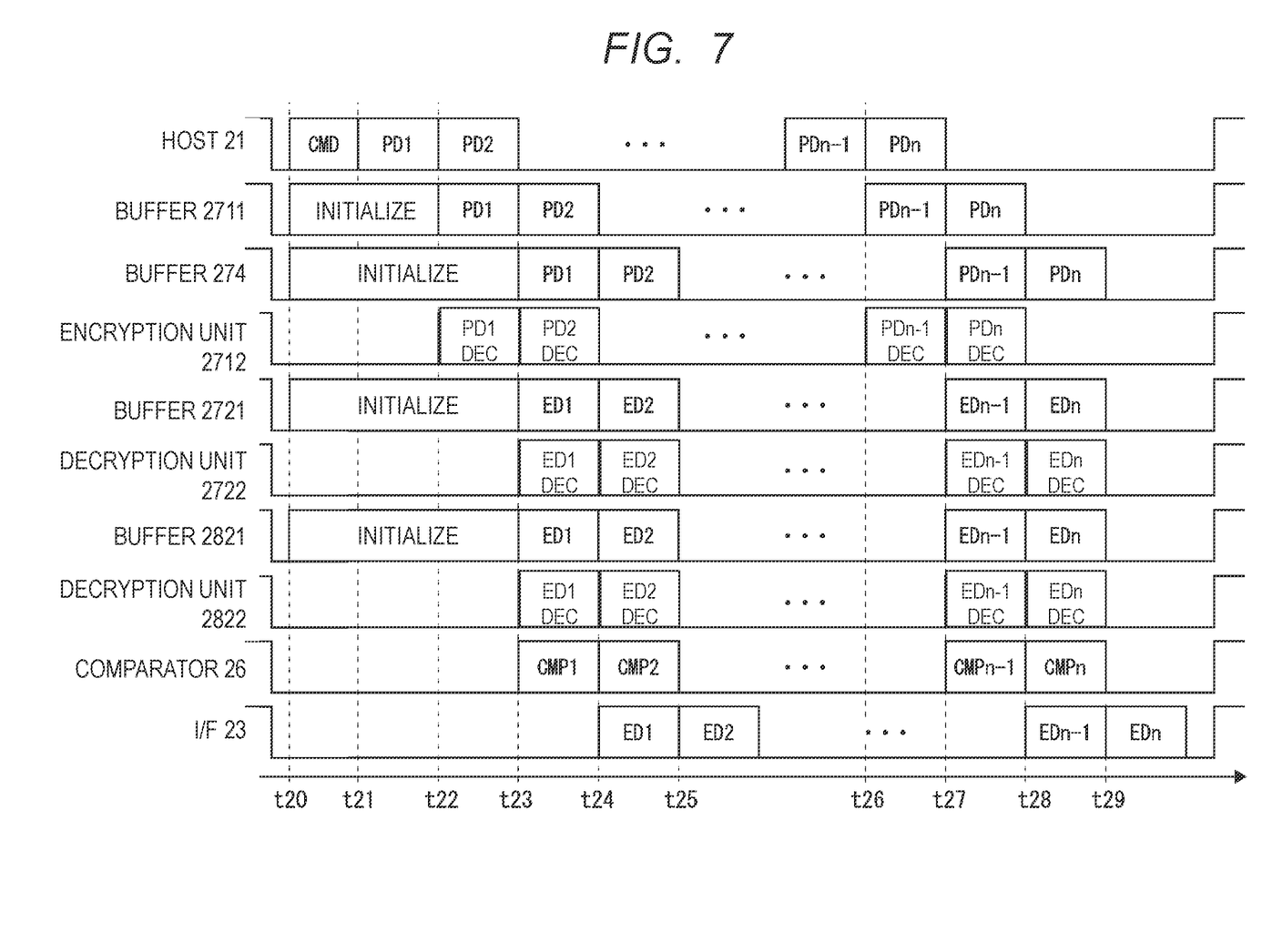
FIG. 7 is a timing chart showing an example of the operation of the semiconductor device shown in FIG. 6.

Subsequently, with reference to FIG. 7, the operation of the semiconductor device 2 will be described. FIG. 7 is a timing chart showing an example of the operation of the semiconductor device 2. In the following description, a case where the data format of the communication protocol includes a control command CMD and plaintext data PD1 to PDn of n (where n is an integer equal to or greater than 1) blocks added to the control command CMD will be described as an example.

First, the host computer 21 transmits the command CMD that instructs the encryption process to the security IP 22 (at t20) and sequentially transmits the plaintext data PD1 to PDn of n blocks following the command CMD (from t21 to t26).

In the security IP 22, the control unit 24 receives the command CMD transmitted from the host computer 21 through the interface unit 23 and decrypts the command CMD. Thus, the control unit 24 recognizes the instruction content from the host computer 21. Here, since the command CMD includes an instruction for encrypting the plaintext data PD1 to PDn, the control unit 24 sets the operation mode to the first mode. Thus, the selectors 273, 283 select and output the output of the encryptor 271. The control unit 24 sequentially receives the plaintext data PD1 to PDn transmitted from the host computer 21 following the control command CMD through the interface unit 23.

The control unit 24 sequentially transfers the plaintext data PD1 to PDn to the encryption module 27 (from t22 to t27).

In the encryption module 27, pipeline process for encryption and decryption is performed for the plaintext data PD1 to PDn. The encryption module 28 also performs pipeline process for the decryption of the encrypted data ED1 to EDn.

Specifically, in the encryptor 271, the buffer 2711 temporarily stores the plaintext data PD1 to PDn sequentially transferred from the control unit 24 (from t22 to t27). Then, the encryption process unit 2712 performs encryption process for the plaintext data PD1 to PDn sequentially stored in the buffer 2711 (from t22 to t27). The encryption data ED1 to EDn sequentially generated by the encryption process unit 2712 are transferred to the decryptor 272 via the selector 273, temporarily stored in the buffer 2721 sequentially (from t23 to t28), transferred to the decryptor 282 via the selector 283, and temporarily stored in the buffer 2821 (from t23 to t28). In parallel with this, the plaintext data PD1 to PDn sequentially stored in the buffer 2711 of the encryptor 271 is temporarily stored in the buffer 274 (from t23 to t28).

In the decryptor 272, the decryption process unit 2722 sequentially generates the decrypted data PD1 to PDn by performing decryption process for the encrypted data ED1 to EDn sequentially stored in the buffer 2721 (from t23 to t28). Similarly, in the decryptor 282, the decryption process unit 2822 sequentially generates the decrypted data PD1 to PDn by performing decryption process for the encrypted data ED1 to EDn sequentially stored in the buffer 2821 (from t23 to t28). Here, the decryption process units 2722, 2822 perform decryption process of the encrypted data in synchronization with the encryption process of the plaintext data by the encryption process unit 2712. Accordingly, since the noise (side channel information) generated by the encryption process of the encryption process unit 2712 is disturbed by the noise generated by the decryption process of the decryption process units 2722, 2822, the immunity to the side channel attack is further improved.

For pipeline process, more particularly, first, the buffer 2711 temporarily stores the plaintext data PD1 transferred from the control unit 24 (at t22). The encryption process unit 2712 performs encryption process on the plaintext data PD1 stored in the buffer 2711 (at t22). The encrypted data ED1 generated by the encryption process unit 2712 is transferred to the decryptor 272 via the selector 273, is temporarily stored in the buffer 2721 (at t23), via the selector 283, is transferred to the decryptor 282, temporarily stored in the buffer 2821 (at t23). The decryption process unit 2722 performs decryption process on the encrypted data ED1 stored in the buffer 2721 to generate the decrypted data PD1 (at t23). Further, the decryption process unit 2822 performs decryption process on the encrypted data ED1 stored in the buffer 2821 to generate the decrypted data PD1 (at t23).

At this time, the buffer 274 temporarily stores the plaintext data PD1 stored in the buffer 2711 of the encryptor 271 (at t23). Further, at this time, the buffer 2711 temporarily stores the plaintext data PD2 that has been transferred next from the control unit 24 (at t23). Thus, the encryption process unit 2712 can immediately perform encryption process on the plaintext data PD2 after the encryption process of the plaintext data PD1 (at t23). The encrypted data ED2 generated by the encryption process unit 2712 is transferred to the decryptor 272 via the selector 273, is temporarily stored in the buffer 2721 (at t24), via the selector 283, is transferred to the decryptor 282, temporarily stored in the buffer 2821 (at t24). The decryption process unit 2722 performs decryption process on the encrypted data ED2 stored in the buffer 2721 to generate the decrypted data PD2 (at t24). Further, the decryption process unit 2822 performs decryption process on the encrypted data ED2 stored in the buffer 2821 to generate the decrypted data PD2 (at t24).

In the encryption modules 27, 28, such pipeline process is repeated until encryption and decryption is performed on plaintext data PDn.

The comparator 26 sequentially compares the plaintext data PD1 to PDn sequentially stored in the buffer 274, the decrypted data PD1 to PDn sequentially generated in the decryptor 272, and the decrypted data PD1 to PDn sequentially generated in the decryptor 282 (from t23 to t28). In the example of FIG. 7, the comparator 26 compares the plaintext data PDi stored in the buffer 274, the decrypted data PDi generated in the decryptor 272, and the decrypted data PDi generated in the decryptor 282 as a CMPi.

Based on the comparison result by the comparator 26, the control unit 24 performs a failure determination for the encryption module 27 (encryptor 271 and decryptor 272) and the encryption module 28 (decryptor 282).

For example, when the plaintext data PD1 to PDn before encryption stored in the buffer 274, the decrypted data PD1 to PDn generated in the decryptor 272, and the decrypted data PD1 to PDn generated in the decryptor 282 coincide with each other, the control unit 24 determines that no failure has occurred in any of the encryptor 271, the decryptor 272 and the decryptor 282. In this case, the control unit 24 sequentially transmits the encrypted data ED1 to EDn generated in the encryptor 271 from the buffer 2721 to the host computer 21 through the interface unit 23 (from t24 to t29).

Further, when the unencrypted plaintext data PD1 to PDn stored in the buffer 274 and the decrypted data PD1 to PDn generated in the decryptor 272 coincide with each other, even if they do not coincide with the decrypted data PD1 to PDn generated in the decryptor 282, it is determined that at least the encryptor 271 and the decryptor 272 have not failed. In this case, the control unit 24 sequentially transmits the encrypted data ED1 to EDn generated in the encryptor 271 from the buffer 2721 to the host computer 21 through the interface unit 23. At this time, the control unit 24 determines that a failure has occurred in the decryptor 282 and controls so as not to adopt the output of the decryptor 282.

Further, when the unencrypted plaintext data PD1 to PDn stored in the buffer 274 and the decrypted data PD1 to PDn generated in the decryptor 282 coincide with each other, even if they do not coincide with the decrypted data PD1 to PDn generated in the decryptor 272, it is determined that at least the encryptor 271 and the decryptor 282 have not failed. In this case, the control unit 24 sequentially transmits the encrypted data ED1 to EDn generated in the encryptor 271 from the buffer 2821 to the host computer 21 through the interface unit 23. At this time, the control unit 24 determines that a failure has occurred in the decryptor 272 and controls so as not to adopt the output of the decryptor 272.

On the other hand, when the decrypted data PD1 to PDn generated in the decryptor 272 and the decrypted data PD1 to PDn generated in the decryptor 282 coincide with each other but the plaintext data PD1 to PDn before encryption stored in the buffer 274 do not coincide with each other, it is determined that a failure has occurred in the encryptor 271. In this case, the control unit 24 does not transmit the encrypted data ED1 to the host computer 21 and interrupts the subsequent processing. In this case, since a failure occurring in the encryptor 271 may be accidental failure, the control unit 24 may perform encryption of the plaintext data PD1 to PDn, the decryption of the encrypted data ED1 to EDn, the comparison of the plaintext data PD1 to PDn with the decrypted data PD1 to PDn, and the failure determination based on the comparison result. However, if it is determined that a failure has occurred in the encryptor 271 even after a predetermined number of repetitions, a failure occurring in the encryptor 271 is determined to be a permanent failure. In this case, for example, the encryptor 281 provided in the encryption module 28 may be used instead of the encryptor 271.

Thus, the semiconductor device 2 according to the present embodiment can identify whether a failure has occurred in the encryptor or a failure has occurred in the decryptor by comparing the plaintext data with a plurality of decrypted data generated by each of the plurality of decryptors. Here, for example, when it is determined that a failure has occurred in the decryptor provided in the encryption module (for example, the encryption module 28) for checking, since the failure can be ignored as a pseudo failure, reduction in throughput due to retry after the failure detection is suppressed. Further, in the semiconductor device 2 according to the present embodiment, since the encryption process by the encryptor and the decryption process by each of the plurality of decryptors are operated in synchronization, the noise (side channel information) generated by the encryption process can be disturbed by the noise generated by the plurality of decryption process, it is possible to further improve the resistance to side channel attacks such as DPA attacks and CPA attacks.

In the present embodiment, a case has been described in which failure determination is performed by comparing the two decrypted data generated using the one encryptor 271 and the two decryptors 272, 282 with the plaintext data, but the present invention is not limited to this. For example, if three or more encryption modules with a decryptor are implemented, a failure determination may be made by comparing each of three or more decrypted data generated using one encryptor 271 and three or more decryptors with plaintext data. This further enhances tolerance to side channel attacks.

Although the invention made by the inventor has been specifically described based on the embodiment, the present invention is not limited to the embodiment already described, and it is needless to say that various modifications can be made without departing from the gist thereof.

In the first and second embodiments, a comparison is made between plaintext data supplied from an external (host computer) and data decrypted by a decryptor after encrypting the plaintext data with an encryptor, but the present invention is not limited to this. For example, the same effect can be achieved even when comparing the encrypted data supplied from the external (host computer) with the data encrypted by the encryptor after the encrypted data is decrypted by the decryptor.

In addition, the present disclosure may be implemented by causing a CPU to run a computer program for some or all of the security IPs.

The program described above includes a group of instructions (or software code) for causing a computer to perform one or more of the functions described in the embodiment when loaded into the computer. The program may be stored on a non-temporary computer-readable medium or on a tangible storage medium. By way of example and not limitation, computer-readable or tangible storage media may include random-access memory (RAM), read-only memory (ROM), flash memory, solid-state drive (SSD) or other memory technologies, CD-ROM, digital versatile disc (DVD), Blu-ray (registered trademark) disks or other optical disk storage, magnetic cassettes, magnetic tapes, magnetic disk storage, or other magnetic storage devices. The program may be transmitted on a temporary computer readable medium or communication medium. By way of example and not limitation, a temporary computer readable medium or communication medium includes an electrical, optical, acoustic, or other type of propagating signal.

What is claimed is:

1. A semiconductor device comprising:
a central processing unit (CPU) configured to function as:
  a first encryptor configured to perform an encryption process on plaintext data input from an external device to generate first encrypted data;
  a first decryptor configured to perform a decryption process on the first encrypted data in real-time synchronization with the encryption process for continuous integrity verification to mitigate side-channel attacks;
  a real-time verification unit comprising:
    a comparator configured to compare the plaintext data and the first decrypted data during the encryption process and the decryption process to detect discrepancies in real time; and
  a control unit configured to:
    perform real-time verification of encryption integrity by continuously comparing the plaintext data and the first decrypted data during the encryption process and the decryption process;
    determine, based on a comparison result between the plaintext data and the first decrypted data, whether a failure occurred in the encryption process by the first encryptor, in the decryption process by the first decryptor, or in both; and
    upon detecting a failure, initiate an immediate fault-handling operation to prevent propagation of invalid encrypted data and trigger a corrective action for encryption reliability.

2. The semiconductor device according to claim 1, wherein the CPU is further configured to function as a data holding unit for holding the plaintext data, and
  wherein the comparator compares the plaintext data stored in the data holding unit with the first decrypted data.

3. The semiconductor device according to claim 1,
  wherein the control unit determines that there is no failure in any of the first encryptor and the first decryptor when the plaintext data and the first decrypted data coincide in the comparison by the comparator, and
  wherein the control unit determines that there is a failure in any of the first encryptor and the first decryptor when the plaintext data and the first decrypted data do not coincide in the comparison by the comparator.

4. The semiconductor device according to claim 1,
  wherein the first encryptor performs the encryption process using S-box (Substitution box), and
  wherein the first decryptor performs the decryption process using inverse element S-box.

5. The semiconductor device according to claim 1,
  wherein, when the control unit determines that there is a failure in any of the first encryptor and the first decryptor, the control unit repeats failure determination process predetermined number of times.

6. The semiconductor device according to claim 1,
  wherein the CPU further configured to function as a first selector for selecting either the first encrypted data or a first external encrypted data that is different from the first encrypted data input from the external device in accordance with an operation mode including at least a first mode and a second mode, and outputting the selected data to the first decryptor,
  wherein, when the operation mode is the first mode, the first selector selects and outputs the first encrypted data, and the first decryptor performs the decryption process for the first encrypted data in synchronization with the encryption process in the first encryptor to generate the first decrypted data, and the comparator compares the plaintext data with the first decrypted data, and
  wherein, when the operation mode is the second mode, the first selector selects and outputs the first external encrypted data, and the first decryptor performs the decryption process for the first external encrypted data to generate a first external decrypted data, and the comparator does not perform comparison using the first external decrypted data.

7. The semiconductor device according to claim 1,
  wherein the first encryptor performs the encryption process for the plaintext data sequentially input from the external device, and sequentially generates a plurality of the first encrypted data,
  wherein the first decryptor performs the decryption process for the plurality of the first encrypted data, and sequentially generates a plurality of the first decrypted data, and
  wherein the comparator sequentially compares a plurality of the plaintext data with a plurality of the first decrypted data.

8. The semiconductor device according to claim 1,
  wherein the CPU further configured to function as a second decryptor for performing the decryption process for the first encrypted data in synchronization with the encryption process in the first encryptor, and generating second decrypted data,
  wherein the comparator compares the plaintext data and the first decrypted data and the second decrypted data, and
  wherein the control unit performs failure determination process for the first encryptor, the first decryptor and the second decryptor in the comparison by the comparator.

9. The semiconductor device according to claim 8,
  wherein the CPU further configured to function as a data holding unit for holding the plaintext data, and
  wherein the comparator compares the plaintext data stored in the data holding unit and the first decrypted data and the second decrypted data.

10. The semiconductor device according to claim 8,
  wherein the control unit determines that there is no failure in any of the first encryptor, the first decryptor and the second decryptor, when the plaintext data, the first decrypted data and the second decrypted data coincide in the comparison by the comparator,
  wherein the control unit determines that there is a failure in the second decryptor when only the plaintext data and the first decrypted data coincide in the comparison by the comparator,
  wherein the control unit determines that there is a failure in the first decryptor when only the plaintext data and the second decrypted data coincide in the comparison by the comparator, and wherein the control unit determines that there is a failure in the first encryptor when only the first decrypted data and the second decrypted data coincide in the comparison by the comparator.

11. The semiconductor device according to claim 8, wherein the first encryptor performs the encryption process using S-box (Substitution box), and
wherein the first decryptor and the second decryptor perform the decryption process using inverse element S-box.

12. The semiconductor device according to claim 8, wherein, when the control unit determines that there is a failure in the first encryptor, the control unit repeats the failure determination process predetermined number of times.

13. The semiconductor device according to claim 12, wherein, when the control unit continues to determine that there is a failure in the first encryptor the failure determination is repeated a predetermined number of times, the second encryptor is used instead of the first encryptor.

14. The semiconductor device according to claim 8, wherein the CPU is further configured to functions as:
a first selector for selecting either the first encrypted data or an external encrypted data that is encrypted data different from the first encrypted data input from the external device in accordance with an operation mode including at least a first mode and a second mode, and outputting the selected data to the first decryptor; and
a second selector for selecting either the first encrypted data or an external encrypted data that is encrypted data different from the first encrypted data input from the external device in accordance with the operation mode, and outputting the selected data to the second decryptor,
wherein, when the operation mode is a first mode, the first selector selects and outputs the first encrypted data, the first decryptor performs decryption process of the first encrypted data in synchronization with the encryption process in the first encryptor to generate the first decrypted data, and the second selector selects and outputs the first encrypted data, the second decryptor performs decryption process of the first encrypted data in synchronization with the encryption process in the first encryptor to generate the second decrypted data, and the comparator compares the plaintext data, the first decrypted data and the second decrypted data, and
wherein, when the operation mode is the second mode, the first selector selects and outputs the first external encrypted data, the first decryptor performs the decryption process on the first external encrypted data to generate the first external decrypted data, and the second selector selects and outputs the second external encrypted data, the second decryptor performs the decryption process on the first external encrypted data to generate the second external decrypted data, and the comparator does not perform comparison using the first external decrypted data and the second decrypted data.

15. The semiconductor device according to claim 8, wherein the first encryptor performs the encryption process for the plaintext data sequentially input from the external device-outside, and sequentially generates a plurality of the first encrypted data,
wherein the first decryptor performs the decryption process for the plurality of the first encrypted data, and sequentially generates a plurality of the first decrypted data,
wherein the second decryptor performs the decryption process for the plurality of the first encrypted data, and sequentially generates a plurality of the second decrypted data, and
wherein the comparator sequentially compares the plurality of the plaintext data and the plurality of the first decrypted data and the plurality of the second decrypted data.

16. A method of controlling a semiconductor device including a first encryptor and a first decryptor, the method comprising:
performing an encryption process for plaintext data input from an external device to generate first encrypted data,
performing a decryption process on the first encrypted data in real-time synchronization with the encryption process for continuous integrity verification to mitigate side-channel attacks,
comparing the plaintext data and the first decrypted data during the encryption process and the decryption process to detect discrepancies in real time,
performing real-time verification of encryption integrity by continuously comparing the plaintext data and the first decrypted data during the encryption process and the decryption process,
determining, based on a comparison result between the plaintext data and the first decrypted data, whether a failure occurred in the encryption process by the first encryptor, in the decryption process by the first decryptor, or in both, and
upon detecting a failure, initiating an immediate fault-handling operation to prevent propagation of invalid encrypted data and trigger a corrective action for encryption reliability.

* * * * *